United States Patent

Eberts

[15] 3,652,915
[45] Mar. 28, 1972

[54] BATTERY CHARGING SYSTEM WITH MEANS FOR SENSING CURRENT, VOLTAGE, GASSING AND TEMPERATURE

[72] Inventor: Klaus Eberts, 4, Grunwaldtrg, Budingen/Hessen, Germany

[22] Filed: Apr. 2, 1970

[21] Appl. No.: 25,045

Related U.S. Application Data

[63] Continuation-in-part of Ser. No. 752,220, Aug. 13, 1968, abandoned.

[52] U.S. Cl. .................................. 320/31, 320/35, 320/39, 320/46
[51] Int. Cl. ........................................................ H02j 7/04
[58] Field of Search ............. 320/35, 36, 46, 52, 61, DIG. 1, 320/39, 40; 200/81.6, 152.9; 338/36, 39

[56] References Cited

UNITED STATES PATENTS

| | | | |
|---|---|---|---|
| 3,392,317 | 7/1968 | Eberts et al. | 320/DIG. 1 |
| 3,296,516 | 1/1967 | Paine et al. | 320/35 |
| 2,649,565 | 8/1953 | Thrig | 200/81.6 |
| 3,069,645 | 12/1962 | Henke | 338/39 |
| 3,098,209 | 7/1963 | Stevens | 338/39 |
| 3,102,222 | 8/1963 | Harmer | 320/46 X |
| 3,123,758 | 3/1964 | Giacalone | 320/46 X |
| 3,174,535 | 3/1965 | Weber | 320/61 UX |
| 3,252,071 | 5/1966 | Plessis | 320/DIG. 1 |
| 3,271,543 | 9/1966 | Schonfeld et al. | 200/81.6 |
| 3,281,640 | 10/1966 | Mas | 320/46 |
| 3,462,356 | 8/1969 | Wallinder | 320/35 X |
| 3,517,295 | 6/1970 | Lapuyude | 320/DIG. 1 |

Primary Examiner—J. D. Miller
Assistant Examiner—Robert J. Hickey
Attorney—Shlesinger, Fitzsimmons and Shlesinger

[57] ABSTRACT

A battery charging system has electronic control means for reducing the charging current in response to attainment of a predetermined battery terminal voltage, a predetermined temperature of the battery and/or a predetermined gassing rate of the battery, and for terminating the charging current when same falls below a predetermined low limit.

4 Claims, 4 Drawing Figures

BATTERY CHARGING SYSTEM WITH MEANS FOR SENSING CURRENT, VOLTAGE, GASSING AND TEMPERATURE

This is a continuation-in-part of application, Ser. No. 752,220, filed Aug. 13, 1968, which is now abandoned.

BACKGROUND OF THE INVENTION

1. Field of the Invention

This invention relates to a system for charging a rechargable battery, and in particular, it relates to a system in which charging current supplied by a unidirectional voltage source to a battery is maintained at a safe level and terminated when the battery has been fully charged.

2. Description of the Prior Art

Battery charging circuits which automatically control the complete charging cycle of the battery and terminate the charging current when the battery is fully charged, are generally known, for example from U.S Pat. No. 3,392,317. In charging a battery with the known charging circuit the charging current is not terminated when the terminal voltage of the battery reaches a predetermined upper level, but charging of the battery is continued with the battery terminal voltage maintained at the predetermined upper level until the charging current decreases below a predetermined lower limit whereupon the charging current is terminated. One problem which arises in the full charging of a battery is that care must be taken that the battery is not damaged by charging at too great a rate which induces overheating and buckling of the electrodes, or by overcharging resulting in gassing, i.e., formation of gas within the container of the battery. If the container is closed, and therefore, there is no possibility for dissipation of the formed gas, the container will be damaged by the gas pressure.

SUMMARY OF THE INVENTION

It is an object of the present invention to provide a battery charging system wherein charging of a battery is controlled by the terminal voltage, the temperature and the gassing rate of the battery.

Another object is to provide such a system which automatically terminates charging when the battery is fully charged.

A further object is to provide such a system wherein a battery is fully charged at a safe rate within a minimum of time.

In accordance with the invention the foregoing objects are accomplished by providing a battery charging system comprising a source of unidirectional charging current, a charging circuit for supplying charging current from said source to a battery to be charged, electronic control means included in said charging circuit for controlling the flow and magnitude of charging current, voltage sensing means for sensing the terminal voltage of said battery, said voltage sensing means being responsive to attainment of a predetermined upper limit of said terminal voltage and being connected to said electronic control means to cause same to decrease the charging current upon such attainment, temperature sensing means mounted in heat-exchange relationship with said battery, said temperature sensing means being responsive to attainment of a predetermined upper limit of said temperature and being connected to said electronic control means to cause same to decrease the charging current upon such attainment, gassing rate sensing means coordinated to the interior space of said battery for sensing the gassing rate of said battery, said gassing rate sensing means being responsive to a predetermined upper limit of said gassing rate and being connected with said electronic control means to cause same to decrease the charging current upon such attainment, and current sensing means connected with said circuit and responsive to decrease of charging current below a predetermined lower limit, said current sensing means being connected to said electronic control means to terminate said charging current upon decrease of said current below said lower limit.

In order that the manner in which the foregoing and other objects are attained in accordance with the invention can be understood in detail, a particularly advantageous embodiment thereof will be described with reference to the accompanying drawings wherein.

Figure 1:
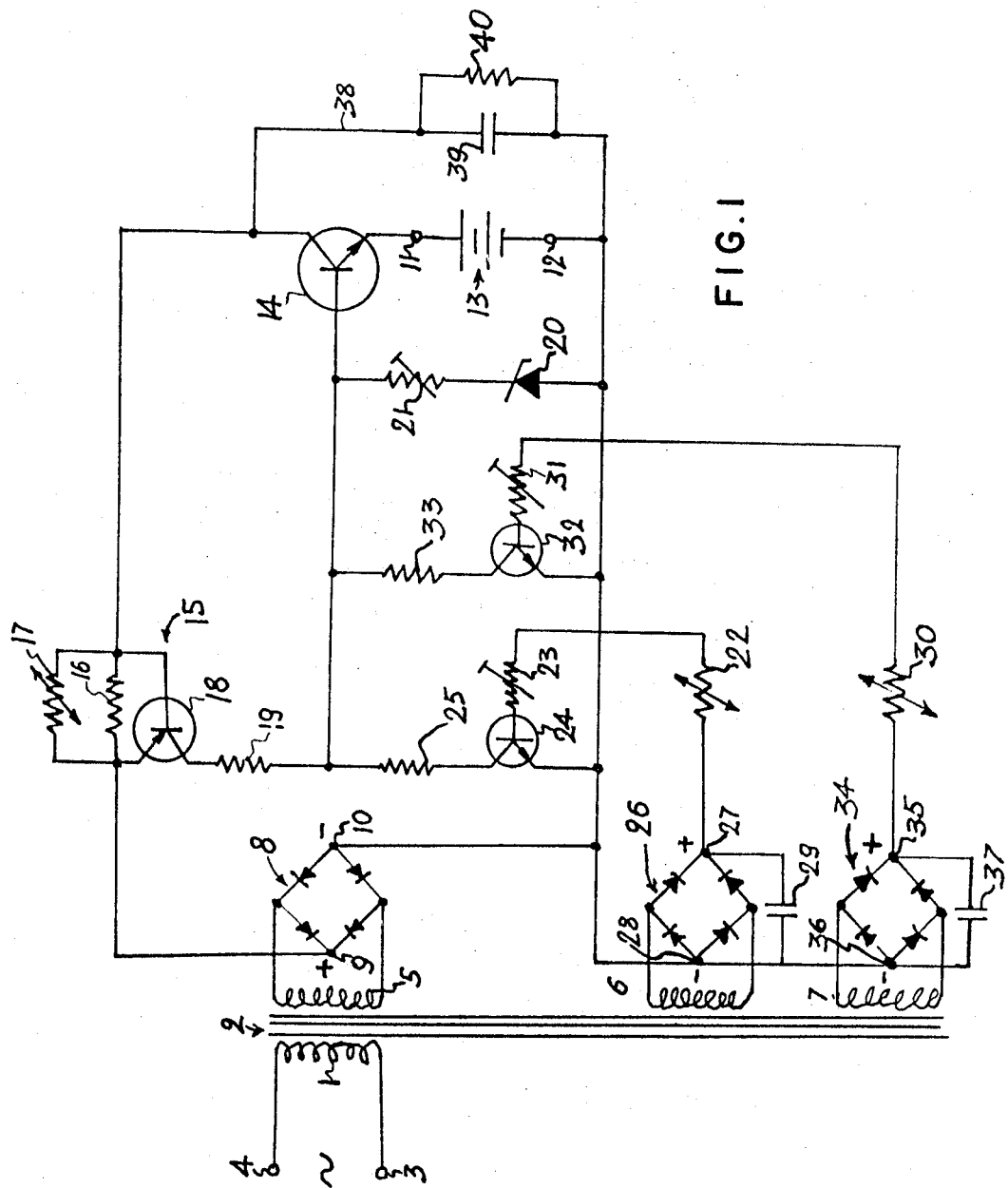
FIG. 1 is a schematic circuit diagram of a preferred embodiment of the invention.

In FIG. 1 a primary winding 1 of an input transformer, generally indicated at 2, is connected to power input terminals 3 and 4 for connection to a conventional alternating current supply. The transformer 2 has secondary windings 5, 6 and 7. To provide unidirectional charging current, the secondary winding 5 is connected to a full wave rectifying diode bridge 8 having a positive output terminal 9 and a negative output terminal 10 for supplying charging current from the output terminals 9, 10 to a pair of output terminals 11, 12 for the connection of a battery 13 to be charged. There is provided a charging circuit including a NPN-type power transistor 14 for controlling the flow and magnitude of charging current to the battery 13, and a current sensing circuit 15 for producing a current-dependent control signal for the power transistor 14. The circuit 15 comprises a resistor 16 connected in series with the charging circuit and a resistor 17 having a negative temperature coefficient connected in parallel to resistor 16 and a PNP-type control transistor 18. The emitter of control transistor 18 is connected with output terminal 9 and the base of control transistor 18 is connected with the collector of power transistor 14 so that the voltage drop across parallel resistors 16, 17 represents the emitter-base voltage of control transistor 18. The collector of control transistor 18 is connected through a resistor 19 to the base of power transistor 14.

A zener diode 20 in series with an adjustable resistor 21 is connected between the base of power transistor 14 and output terminal 12 for sensing the terminal voltage of the battery 13 connected to output terminals 11 and 12.

For sensing the temperature of the battery a temperature sensitive resistor having a negative temperature coefficient or a thermistor 22 is mounted in heat-exchange relationship with the battery 13 such that the temperature of resistor 22 is substantially the same as the temperature of the container, electrolyte or electrodes of the battery 13. Resistor 22 is connected through an adjustable resistor 23 to the base of a NPN-type control transistor 24. The emitter of control transistor 24 is connected to output terminal 10 and the collector of control transistor 24 is connected through a resistor 25 to the base of power transistor 14. The resistor 25 limits the current flow through transistor 24 to a permissible upper limit. To provide bias voltage for the base of control transistor 24, the secondary winding 6 of transformer 2 is connected to a full wave rectifying diode bridge 26 having a positive output terminal 27 and a negative output terminal 28. A filter capacitor 29 is connected between the terminals 27 and 28 to smooth the output of the bridge. Negative output terminal 28 is connected with output terminal 10 and positive output terminal 27 is connected through series connected resistors 22 and 23 to the base of control transistor 24.

For sensing the rate of gassing which is related to the gas-pressure within the interior space of the battery 13, a resistor 30 having a resistance depending on the gas-pressure in the interior space of the battery 13 is provided. The resistor 30 is preferably a pressure sensitive resistor disposed at the battery 13 such that the gas-pressure prevailing within the interior space of the battery can act onto the pressure sensitive resistor 30. The resistance of resistor 30 decreases when the pressure applied thereto increases.

Temperature sensitive resistor 22 and pressure sensitive resistor 30 are preferably mounted to a plug member fitting into a conventional opening provided in the cover of the battery container for filling electrolyte into the interior space of the battery. The plug member may be inserted into the opening to subject the temperature sensitive resistor 22 to the temperature of the battery container or to the temperature of the electrolyte and to subject the pressure sensitive resistor 30 to the gas-pressure within the interior space of the battery container.

The pressure sensitive resistor 30 is connected through an adjustable resistor 31 to the base of a NPN-type control transistor 32. The emitter of control transistor 32 is connected to the negative output terminal 10 and the collector of control transistor 32 is connected through a resistor 33 to the base of power transistor 14. The resistor 33 limits the current flow through transistor 32 to a permissible level. To provide bias voltage to the base of transistor 32, the secondary winding 7 of the transformer 2 is connected to a full wave rectifying diode bridge 34 having a positive output terminal 35 and a negative output terminal 36. A filter capacitor 37 is connected between the terminals 35 and 36. Negative terminal 36 is connected with negative output terminal 10 and positive terminal 35 is connected through pressure sensitive resistor 30 and adjustable resistor 31 to the base of control transistor 32. The power transistor 14 and the output terminals 11 and 12 are bypassed by a branch line 38 including a capacitor 39. A resistor 40 is shunted across the capacitor 39.

The operation of the battery charging system shown in FIG. 1 will now be described. When input terminals 3 and 4 are connected to an alternating current source a direct voltage appears across output terminals 9 and 10. This direct voltage is applied to the capacitor 39 and, therefore, a current charging the capacitor 39 will flow through parallel resistors 16 and 17. During the short period of time in which the capacitor 39 is charged, the current flowing through parallel resistors 16 and 17 produces a voltage drop across these resistors and, therefore, a potential on the emitter of control transistor 18 which is higher than the potential on the base of control transistor 18. The control transistor 18 goes into conduction and collector current of the control transistor 18 flows through the base-emitter circuit of power transistor 14 which is thereby placed in conduction. As a result, charging current flows from terminal 9 through resistors 16 and 17, collector-emitter circuit of power transistor 14 and battery 13 to terminal 10. The collector current of control transistor 18 controlling the conductivity of power transistor 14 is limited by resistor 19 such that a charging current of a desired maximum magnitude is supplied to the battery 13. The battery 13 will be charged gradually and the terminal voltage of battery 13 increases with increasing charge. When the terminal voltage of the battery 13 reaches a predetermined upper limit, the zener diode 20 will become conductive. As a result, the conductivity of power transistor 14 will be reduced and the charging current will decrease and will effect a corresponding restriction of the terminal voltage of the battery to the predetermined value. The upper limit of the terminal voltage may be adjusted by means of the adjustable resistor 21. Under the effect of the constant charging voltage on the terminals of the battery 13 the charging current will decrease gradually. The voltage drop across parallel resistors 16 and 17 decreases in proportion thereto until it reaches a lower limit at which it is no longer able to keep control transistor 18 conductive. The resistance of parallel connected resistors 16, 17 is chosen in dependence of the capacity of the battery 13 so that cutting off of control transistor 18 occurs exactly at the instant when the battery has been fully charged.

After the battery 13 has been charged, it may be disconnected and the primary winding 1 of transformer 2 may be also disconnected from the alternating current supply. The capacitor 39 will be slowly discharged through resistor 40 to bring the battery charging system in condition for renewed operation.

Let us now assume that the temperature of the battery 13 rises during charging to a predetermined upper limit. The temperature of resistor 22 will also rise and the resistance of resistor 22 will decrease to a lower value so that current will flow from terminal 27 to the base of control transistor 24 which is thereby placed in conduction. The resulting current through control transistor 24 causes a decrease of the conductivity of power transistor 14 whereby the charging current is reduced.

The charging current will be reduced in a similar manner when the gas-pressure within the interior space of the battery reaches a predetermined upper limit. In this case the resistance of resistor 30 will drop to a lower value so that current from terminal 35 will flow to the base of control transistor 32 which thereby will be rendered conductive. As a result, the current through control transistor 32 will render power transistor 14 less conductive so that the charging current will be reduced to a safe value.

Figure 2:
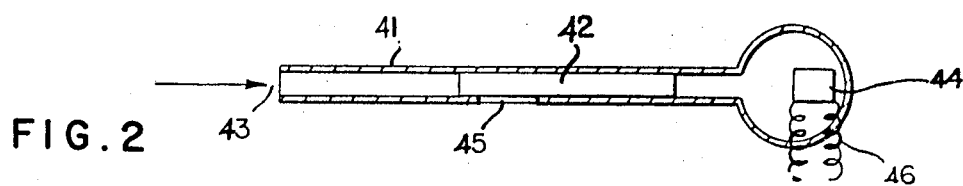
FIG. 2 shows a gas-pressure sensing device usable in practising the present invention.

The predetermined upper limit of the temperature and of the gas-pressure may be adjusted by means of the adjustable resistors 23 and 31, respectively. FIG. 2 shows an embodiment of a gas-pressure sensing device comprising a cylinder 41 in which a gas-pressure operated body 42 is slidable. The device is placed into the filling opening of a battery to be charged by a charging system shown in FIG. 1 so that the gas-pressure within the interior space of the battery can act through the opening 43 of cylinder 41 upon the body 42 to force same towards a pressure sensitive resistor 44 within the closed end portion of cylinder 41. The resistor 44 is provided with connecting leads 46 for connection between positive output terminal 35 and resistor 31 in the battery charging system shown in FIG. 1. When the gassing rate of the battery increases, a gas-pressure related to the gassing rate will be built up within the closed interior space of battery and, therefore, the gas-pressure will move the body 42 in the direction towards the resistor 44 whereby a fluidtight but gas-pervious opening 45 in the wall of the cylinder 41 will be exposed for free escape of the gas. When the body 42 is moved in the direction towards the resistor 44, the pressure within the closed end of cylinder 41 will increase. The resistor 44 is subjected to this pressure, and, therefore, the resistance of resistor 44 will decrease.

Figure 3:
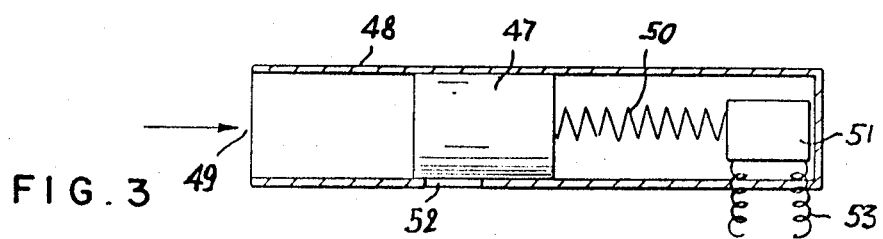
FIG. 3 shows a modified form of a gas-pressure sensing device.

FIG. 3 shows a modified form of a gas-pressure sensing device. A piston 47 is slidably guided in a cylinder 48 which is closed at one end. The open end 49 of the cylinder 48 can be placed over the filling opening of the battery to be charged. A gas-pressure may be built up within the closed interior space of the battery during charging due to gassing. The gas-pressure forces piston 47 against the action of a spring 50 towards a pressure sensitive resistor 51. When the piston 47 is moved towards the resistor 51, the resistance of resistor 51 will be decreased and an opening 52 in the cylinder wall will be exposed for escape of the gas. The resistor 51 is provided with connecting leads 53 for connection between terminal 35 and resistor 31 in the charging system disclosed in FIG. 1.

Figure 4:
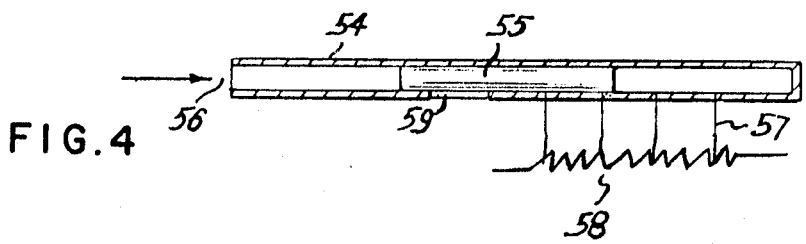
FIG. 4 shows a still further form of a gas-pressure sensing device.

FIG. 4 shows a further embodiment of a gas-pressure sensing device comprising a cylinder 54 closed at one end and containing a column 55 of an electrically conductive liquid, for example, mercury. The cylinder 54 is adapted to be connected with a battery to be charged such that the gas-pressure within the closed interior space of the battery may act through the opening 56 of cylinder 54 on column 55. When the gas-pressure within the interior space of the battery increases due to an increase in the gassing rate the column 55 will be forced towards the closed end of cylinder 54. When moving towards the closed end of cylinder 54 the column 55 will shortcircuit contacts 57 which are disposed in spaced relation along the cylinder 54. The contacts 57 are connected to a resistor 58 at spaced points along the length thereof. As a result, the resistance of resistor 57 will be decreased step-by-step when column 55 moves towards the closed end of cylinder 54 due to increasing gas-pressure within the closed interior space of the battery. Also here through the movement of column 55 a gas permeable opening 59 in the wall of cylinder 54 is exposed to permit free escape of the gas. The resistor 58 may be connected by suitable connecting leads between terminal 35 and resistor 31 of the charging system shown in FIG. 1.

While the invention has been claimed in connection with one embodiment thereof, it is to be understood that it is capable of further modification, and this application is intended to cover any variations, uses or adaptions of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

What I claim is:

1. Apparatus for charging a battery, comprising
a source of unidirectional charging current,
a pair of output terminals for connection with a battery to be charged,
an electrical charging circuit for supplying charging current from said source to said terminals,
a transistor having emitter and collector connected in series with said charging circuit for controlling the flow and magnitude of the charging current in response to at least one of a plurality of control signals applied to the base of said transistor,
voltage sensing means connected across said output terminals and providing one of said control signals when the voltage across said output terminals rises to a predetermined value, temperature sensing means mounted in heat-exchange relationship with said battery and responsive to the temperature of said battery for providing one of said control signals when said temperature rises to a predetermined value,
gas-pressure sensing means coordinated to the interior space of said battery and responsive to the gas-pressure therein for providing one of said control signals when the gas-pressure within said battery rises to a predetermined value,
circuit means connected to said above means and to said base of said transistor to decrease the conductivity of said transistor and to diminish charging current in response to said signals,
and current sensing means connected to said circuit and said base and responsive to the magnitude of the charging current to render said transistor conductive when the magnitude of said charging current exceeds a predetermined lower limit, and to render said transistor non-conductive when the magnitude of said charging current drops below said limit,
the gas-pressure sensing means comprising
a cylinder adapted to communicate at one end with said interior of said battery to receive gas therefrom,
a piston slidable in said cylinder,
a pressure sensitive device arranged in said cylinder at its opposite end, and
a spring disposed in said cylinder between said piston and said pressure sensitive device,
said cylinder having a port in its wall through which gas can escape from said cylinder when said piston has moved a predetermined distance in said cylinder towards said device due to increasing gas pressure.

2. Battery charging apparatus comprising
a source of unidirectional charging current,
a pair of output terminals for connection with a battery to be charged,
an electrical charging circuit for supplying charging current from said source to said terminals,
a power transistor having emitter and collector connected in series with said charging circuit for controlling the flow and magnitude of the charging current in response to at least one of a plurality of control signals applied to the base of said transistor,
voltage sensing means connected across said output terminals and providing one of said control signals when the voltage across said output terminals rises to a predetermined value, temperature sensing means mounted in heat-exchange relationship with said battery and responsive to the temperature of said battery for providing one of said control signals when said temperature rises to a predetermined value,
gas-pressure sensing means coordinated to the interior space of said battery and responsive to the gas-pressure therein for providing one of said control signals when the gas-pressure within said battery rises to a predetermined value,
circuit means connected to said above means and to said base of said transistor to decrease the conductivity of said transistor and to diminish charging current in response to said signals,
and current sensing means connected to said circuit and said base and responsive to the magnitude of the charging current to render said transistor conductive when the magnitude of said charging current exceeds a predetermined lower limit, and to render said transistor non-conductive when the magnitude of said charging current drops below said limit, said gas-pressure sensing means comprising a cylinder adapted to communicate at one end with said interior of said battery, a gas-pressure actuated body of electrically conductive material slidable in said cylinder, a plurality of electrical contacts provided in spaced relation to one another along the length of said cylinder to be contacted successively by said body as it moves longitudinally in said cylinder due to increasing gas pressure,
said cylinder having a port in its wall through which gas can escape when said body has moved a predetermined distance in said cylinder towards its opposite end, said contacts being electrically connected to a resistor element at spaced points along the length thereof,
said resistor element being included in the base circuit of a control transistor having its emitter connected to said charging circuit and having its collector connected to said base of said power transistor.

3. Battery charging apparatus comprising
a source of unidirectional charging current,
a pair of output terminals for connection with a battery to be charged,
an electrical charging circuit for supplying charging current from said source to said terminals,
a power transistor having emitter and collector connected in series with said charging circuit for controlling the flow and magnitude of the charging current in response to at least one of a plurality of control signals applied to the base of said transistor,
voltage sensing means connected across said output terminals and providing one of said control signals when the voltage across said output terminals rises to a predetermined value, temperature sensing means mounted in heat-exchange relationship with said battery and responsive to the temperature of said battery for providing one of said control signals when said temperature rises to a predetermined value, gas-pressure sensing means coordinated to the interior space of said battery and responsive to the gas-pressure therein for providing one of said control signals when the gas-pressure within said battery rises to a predetermined value,
circuit means connected to said above means and to said base of said transistor to decrease the conductivity of said transistor and to diminish charging current in response to said signals,
and current sensing means connected to said circuit and said base and responsive to the magnitude of the charging current to render said transistor conductive when the magnitude of said charging current exceeds a predetermined lower limit, and to render said transistor non-conductive when the magnitude of said charging current drops below said limit,
said gas-pressure sensing means comprising a gas-pressure operated body sliding in a cylinder which is adapted to communicate at one end with the interior space of said battery to move said body in said cylinder upon increase of gas pressure in said battery, and a pressure sensitive device disposed at the opposite end of said cylinder to generate a control signal upon movement of said body towards said pressure sensitive device, said cylinder having a port in its wall for escape of the gas from said cylinder, said port being disposed at a point along the length of said cylinder wall normally to be closed by said body but to be opened upon movement of said body towards said device, said pressure sensitive device comprising a pressure sensitive resistor, a control transistor having its base connected to said pressure sensitive resistor, its emitter connected to said charging circuit, and its collector connected to said base of said power transistor.

4. Battery charging circuit as claimed in claim 1, wherein said pressure sensitive device comprises a pressure sensitive resistor, a control transistor having its base connected to said pressure sensitive resistor, its emitter connected to said charging circuit, and its collector connected to said base of said power transistor.

* * * * *